United States Patent [19]
Sobue

[11] Patent Number: 5,294,996
[45] Date of Patent: Mar. 15, 1994

[54] IMAGE PROCESSING APPARATUS ADAPTABLE FOR USE AT VARIABLE RESOLUTION

[75] Inventor: Ikuo Sobue, Kanagawa, Japan

[73] Assignee: Canon Kabushiki Kaisha, Tokyo, Japan

[21] Appl. No.: 599,507

[22] Filed: Oct. 18, 1990

[30] Foreign Application Priority Data

Oct. 18, 1989 [JP] Japan .................. 1-269225

[51] Int. Cl.$^5$ .............................................. H04N 1/00
[52] U.S. Cl. ................................................... 358/298
[58] Field of Search .................. 346/160, 107 R, 108; 358/296, 298, 456

[56] References Cited

U.S. PATENT DOCUMENTS

| | | | |
|---|---|---|---|
| 4,361,394 | 11/1982 | Sakai et al. | 355/8 X |
| 4,387,983 | 6/1983 | Masegi | 355/8 |
| 4,476,474 | 10/1984 | Kitamura | 346/160 |
| 4,517,579 | 5/1985 | Kitamura | 346/160 |
| 4,819,066 | 4/1989 | Miyagi | 358/283 X |
| 4,878,068 | 10/1989 | Suzuki | 358/296 X |
| 4,905,023 | 2/1990 | Suzuki | 358/298 X |
| 4,958,238 | 9/1990 | Katayama et al. | 358/456 |

*Primary Examiner*—Jonathan Wysocki
*Attorney, Agent, or Firm*—Fitzpatrick, Cella, Harper & Scinto

[57] ABSTRACT

An image processing apparatus suitable for use in a laser beam printer includes an input circuit for inputting image data, and a processing circuit for processing the image data input via the input circuit. The processing circuit includes a converter for converting resolution of the image data, and for outputting converted image data. The processing circuit further includes a pulse-width-modulated signal generating circuit for generating a pulse-width-modulated signal in accordance with a pattern of the image data.

8 Claims, 9 Drawing Sheets

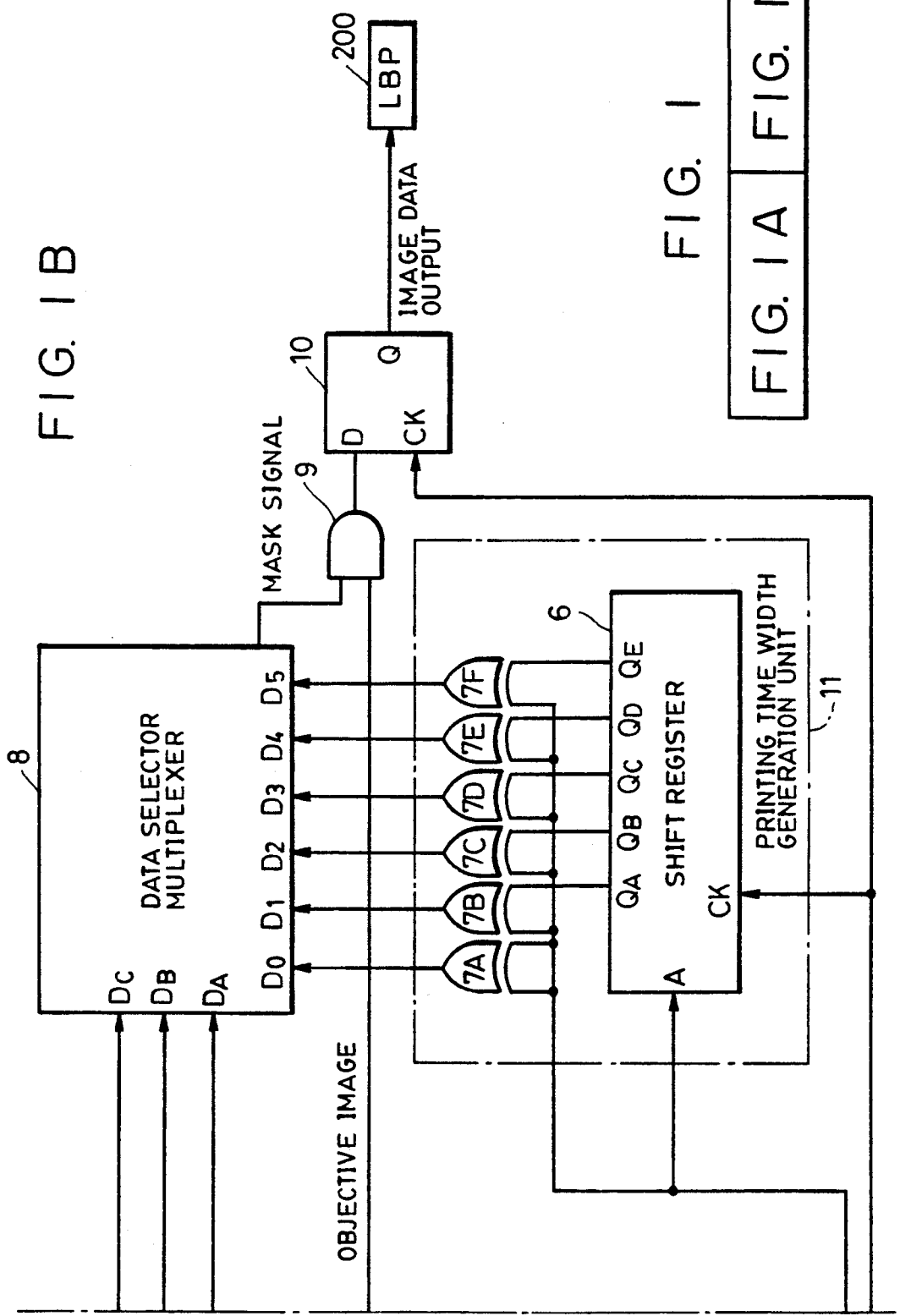

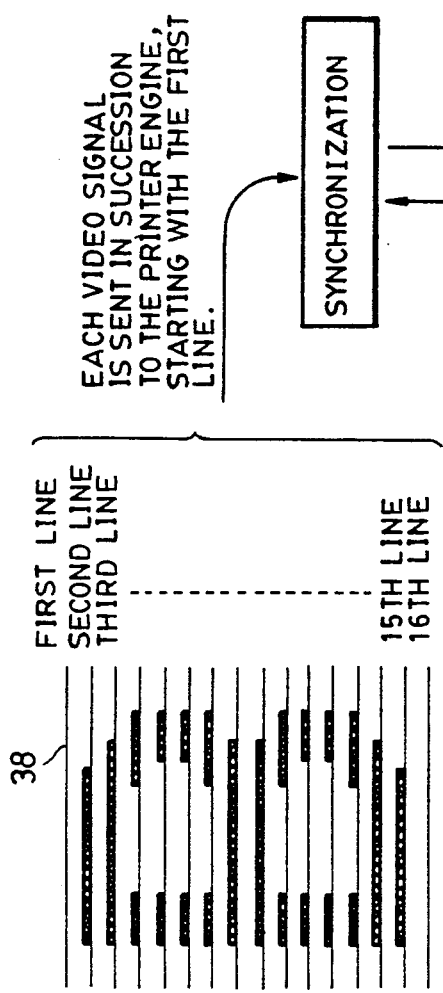
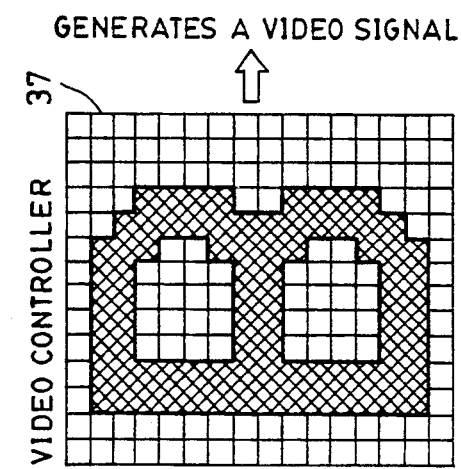
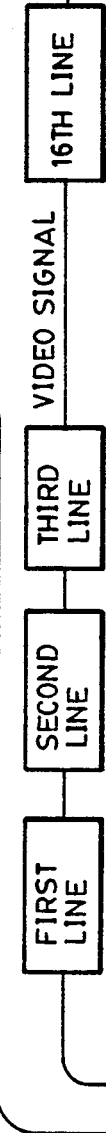
FIG. 3A
FIG. 3
| FIG. 3A |
| FIG. 3B |

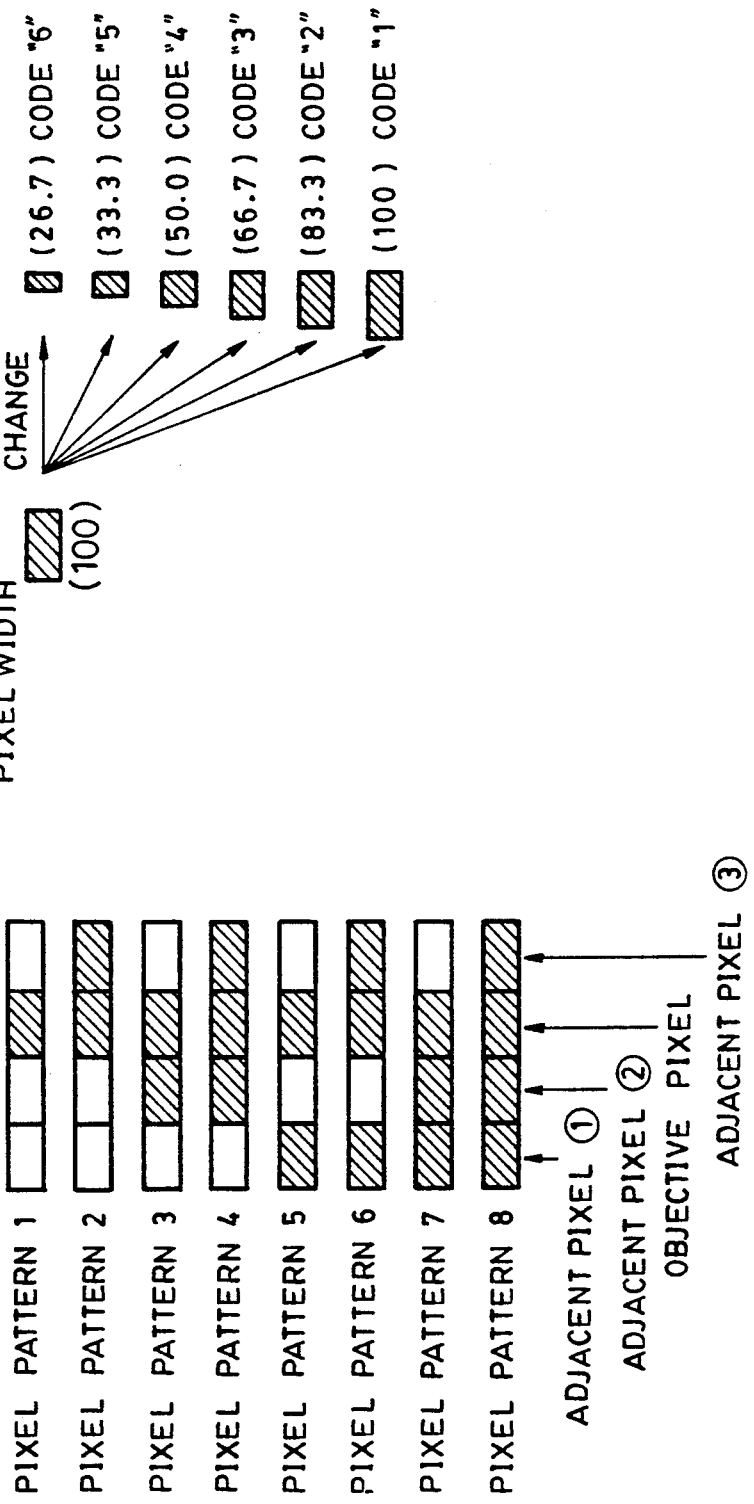

FIG. 5(a)
| PIXEL PATTERN | 1 | 2 | 3 | 4 | 5 | 6 | 7 | 8 |
|---|---|---|---|---|---|---|---|---|
| CODE | 5 | 4 | 4 | 2 | 4 | 4 | 4 | 2 |
FIG. 5(b-1)
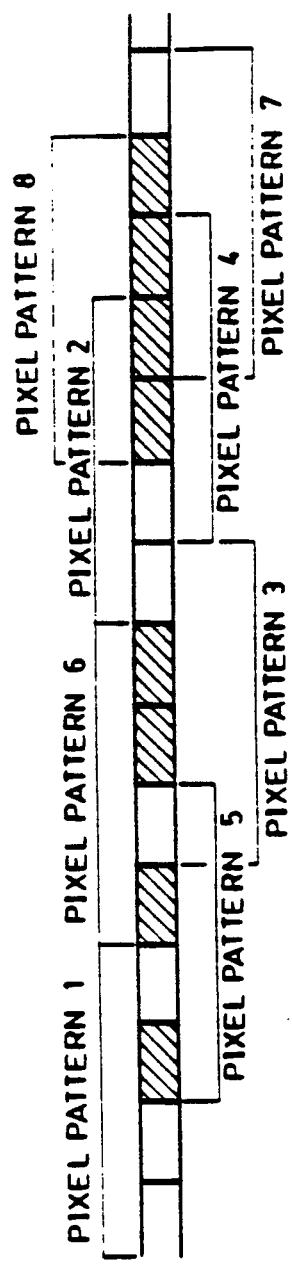
FIG. 5(b-2)
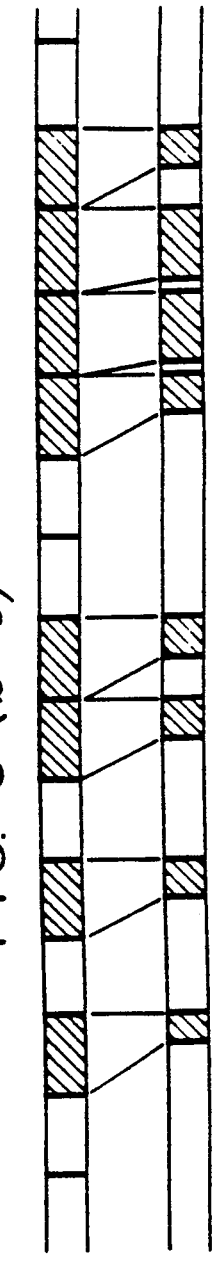
PRINTING TIME WIDTH OBTAINED WITHOUT PROCESSING INPUT PIXEL DATA
PRINTING TIME WIDTHS

IMAGE PROCESSING APPARATUS ADAPTABLE FOR USE AT VARIABLE RESOLUTION

BACKGROUND OF THE INVENTION

1. Field of the Invention

This invention relates to an image processing apparatus, and more specifically to an image processing apparatus which can improve the quality of the output image.

2. Related Background Art

A known image processing apparatus, such as a copying machine, a facsimile apparatus, etc., is used for converting dot resolution in an image.

Such a known image processing apparatus is structured to print recording data (data to be recorded) in such a way as simply to increase the size of a dot by four times, in a case where a printer designed to operate at a dot recording resolution of 400 dpi (dots per inch) is used for printing recording data of 200 dpi, for example.

However, the known image processing apparatus suffers from the problem that the whole output image is darkened, or what should be a thin line of the output image is excessively wide because four times the size of dot is used for printing notwithstanding the printer has an ability of 400 dpi dot resolution.

The apparatus further has a defect that printing density is darkened in such a manner as to give the output image a strange appearance in the case where an isolated dot of, e.g., 200 dpi size, processed by an artificial halftone processing method, is printed.

Especially, a laser beam printer using an electrophotographic method of printing has the defect that an increase of a darkened rate is conspicuous because of a fogging phenomenon which occurs due to the overlapping and combination of adjacent dots, or because of the round shape of the beam spot.

In recent years, an error diffusion method has been proposed as an artificial halftone processing method. When a laser beam printer records an image based on binary data processed by the error diffusion method, there is a possibility that dots may be linked in a highlight portion because the shape of the dots is round and the size of the dots is large. This has resulted in the defect that what should be a thin line in the output image is made to seem fat, or sometimes, a peculiar striped pattern occurs in the output image.

Methods for obtaining a fine line of a proper width and generally for obtaining a proper reproduced image are disclosed in U.S. Pat. Nos. 4,387,983; 4,476,474; 4,517,579; 4,878,068; and 4,905,023, assigned to the assignee of the present invention, but further improvement of those methods has been sought.

SUMMARY OF THE INVENTION

Accordingly, an object of the present invention is to provide an image processing apparatus that can overcome the problems described above.

Another object of the present invention is to provide an image processing apparatus that permits reproduction of images with high quality.

Still another object of the present invention is to provide an image processing apparatus that performs dot resolution conversion with a superior quality image.

It is still another object of the present invention to provide an image processing apparatus that permits reproduction of images with high quality at high speed.

It is still another object of the present invention to provide an image processing apparatus that can provide, with a very simple arrangement, a superior quality image.

Still another object of the present invention is to provide an image processing apparatus which can secure the quality of an output using an error diffusion method.

In accordance with a preferred embodiment, the image processing apparatus of the present invention includes an input circuit for inputting image data. A processing circuit processes the image data input from the input circuit. The processing circuit includes a converter and a pulse-width-modulated signal generator. The converter converts resolution of the image data and outputs the resulting converted image data. The pulse-width-modulated signal generator generates a pulse-width-modulated signal in accordance with a pattern of the image data and the converted image data.

In accordance with another aspect of the present invention, the image processing apparatus includes an input circuit for inputting image data. A processing circuit processes the image data input from the input circuit. The processing circuit includes a recording dot size control signal generator. The recording dot size control signal generator generates a recording dot size control signal in accordance with a pattern of the image data.

In accordance with still another aspect of the invention, the image processing apparatus includes an input circuit for inputting image data. A processing circuit processes the image data input from the input circuit. The processing circuit includes a discrimination circuit and a recording dot size control signal generator. The discrimination circuit discriminates continuity of object image data with neighboring image data. The recording dot size control signal generator generates a recording dot size control signal in accordance with a discrimination result obtained by the discrimination circuit.

Other objects, features, and advantages of the invention will become apparent from the following detailed description of the preferred embodiment of the present invention and the accompanying drawings.

BRIEF DESCRIPTION OF THE DRAWINGS

FIGS. 1A and 1B are block diagrams showing the structure of an image processing apparatus according to the preferred embodiment;

FIGS. 3A and 3B are schematic illustrations illustration of a laser beam;

FIGS. 5($b$-1) and 5($b$-2) are illustrations showing a pattern;

FIG. 4($a$) is an illustration for explaining white and black pixel patterns;

FIG. 4($b$) is an illustration showing various possible printing time widths and the corresponding time ratios;

FIG. 5($a$) is a diagram of codes corresponding to each pattern;

FIGS. 5($b$-1), 5($b$-2) is an illustration showing a pattern extraction of a pixel line and showing outputs of each printing time width;

DETAILED DESCRIPTION OF THE PREFERRED EMBODIMENT

The preferred embodiment of the present invention will be described in detail herein with reference to the accompanying drawings.

Figure 1A:
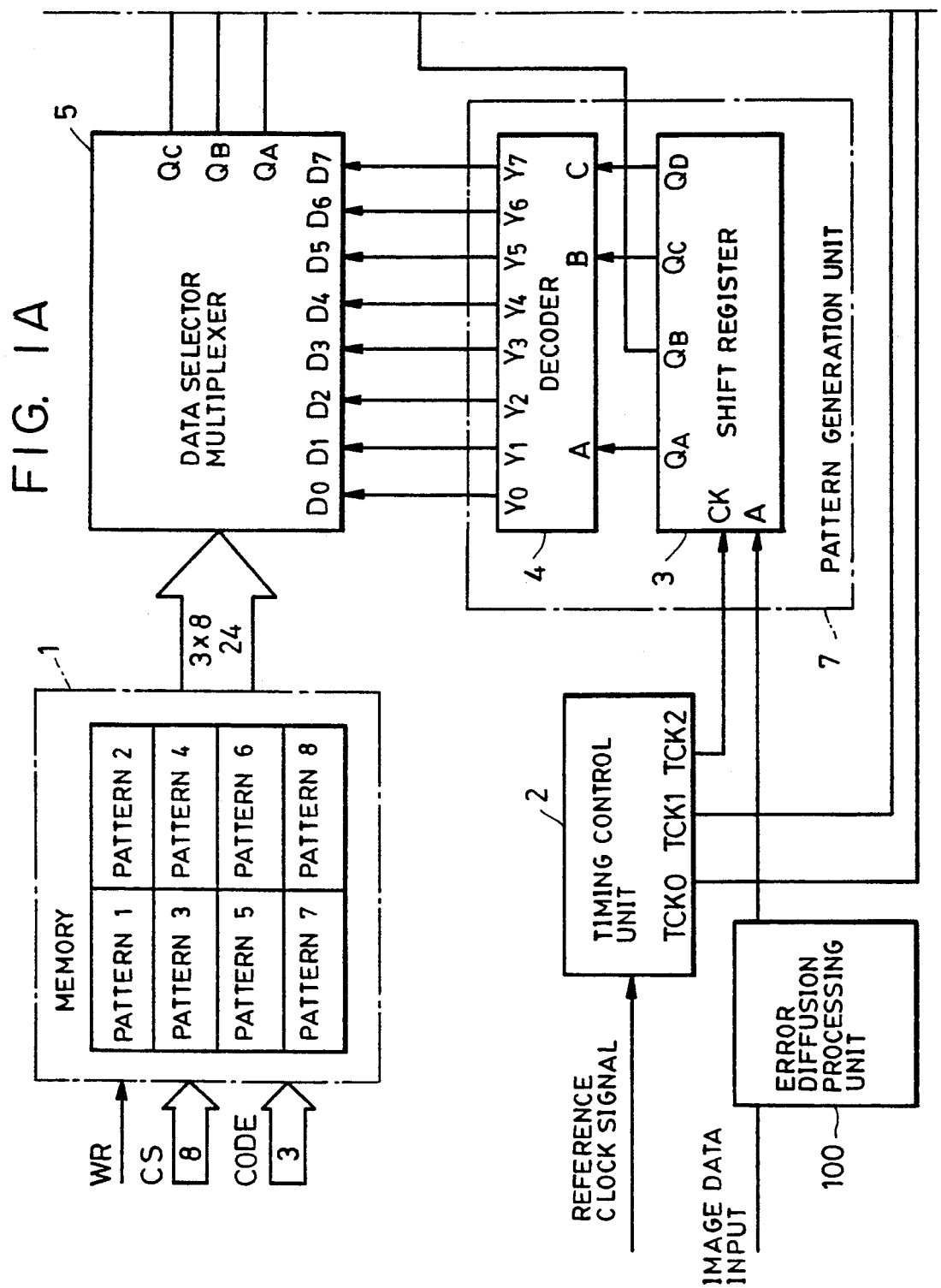

FIG. 1 is a block diagram showing the structure of an image processing apparatus according to the preferred embodiment of the present invention. Image data input to the circuit shown in FIG. 1 is binary data halftone-processed by an error diffusion processing unit 100. In a case where the circuit shown in FIG. 1 belongs to a facsimile apparatus, the incoming image data is binary data, which is halftone-processed by an error diffusion method in the calling station before transmission to the illustrated circuit (which in that case naturally does not include unit 100 to process incoming data).

Figure 8:
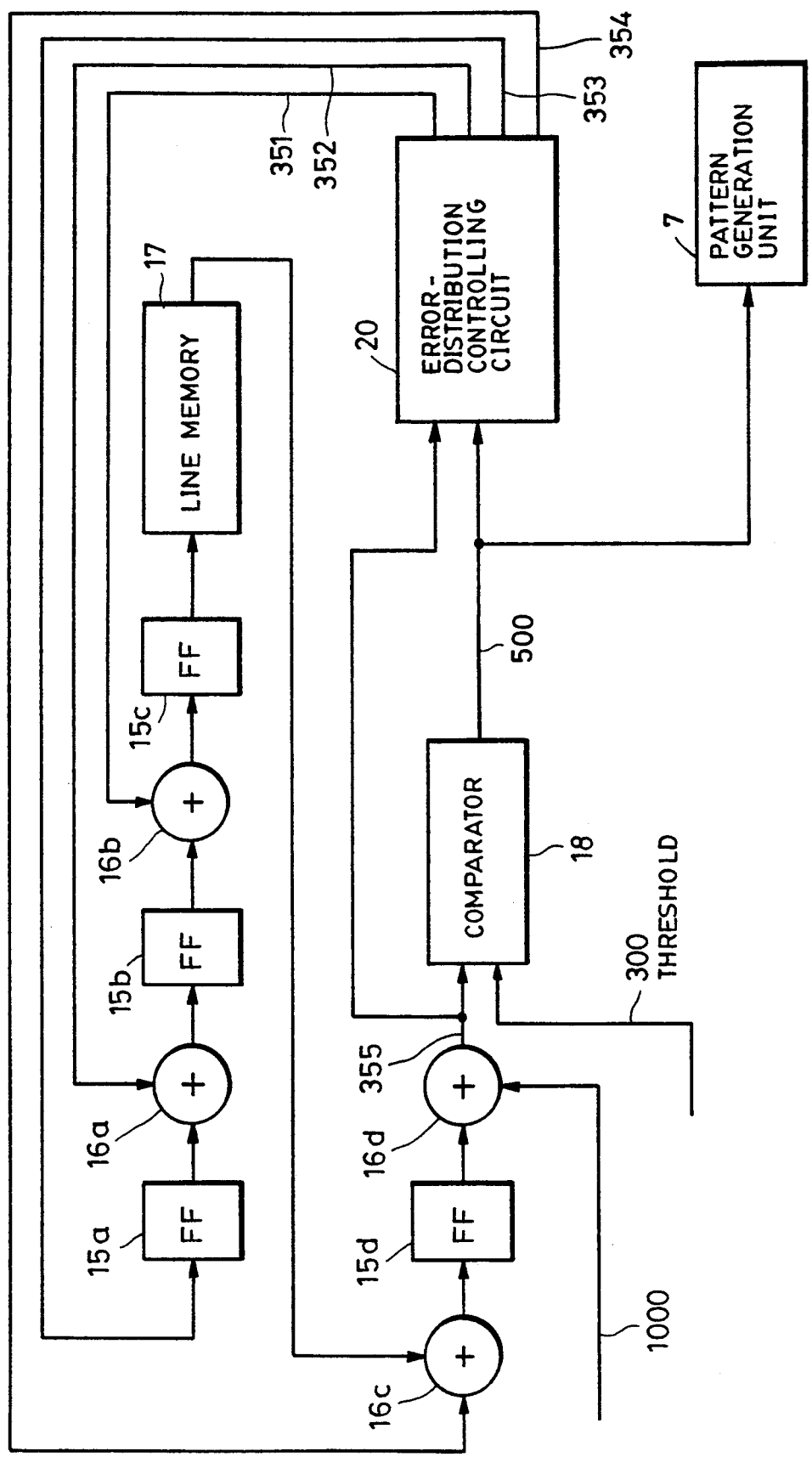
FIG. 8 is a block diagram showing a structure of an error diffusion processing unit 100.

FIG. 8 shows the structure of the error diffusion processing unit 100, which includes flip-flops (hereinafter referred to simply as "FF(s)") 15a to 15d for latching data, adders 16a to 16d, a line memory 17 for introducing a time delay of one line, a comparator 18, an AND gate 19, and an error-distribution controlling circuit 20.

First, the corrected data (original-image data corresponding to the position of the object pixel, i.e., the pixel currently of interest (i, j)) is input to the adder 16d through the data line 1000. In the adder 16d, the corrected data is added to a quantity representing an error (stored in FF 15d) which is to be distributed to the pixel position (i, j) (i.e., which is to be added to the image information of the pixel position). The added value is output to the comparator 18 and the error-distribution controlling circuit 20 via data line 355. The comparator 18 compares the data on data line 355 with the threshold data (on signal line 300), and outputs a binarized signal representing the result of this comparison. If the value of the data on data line 355 is larger than the threshold data, the comparator 18 outputs "1" to signal line 500, and otherwise outputs "0".

The error-distribution controlling circuit 20 calculates the difference (error) between the signal on line 355 before binarization and a value obtained by multiplying the value on the binarized signal line 500 by 255 (i.e., "0" or "255"). The error-distribution controlling circuit 20 controls outputting of error-amount signals on lines 351 to 354 to be distributed to the neighboring pixels. If the position of the object pixel is (i,j), the error amounts on lines 351 to 354 are added to the error amounts which have previously been distributed to the respective pixel positions $(i-1, j+1)$, $(i, j+1)$, $(i+1, j+1)$, and $(i+1, j)$ in the corresponding adders 16a to 16d.

The circuit shown in FIG. 1 includes a memory 1 for storing code data showing set periods of printing times corresponding to each of several possible pixel patterns made up of three pixels adjacent to the object pixeled in the same main-scanning line with it. Each of the eight possible pixel patterns is drawn in FIG. 4(a), and for example, a printing time (black pixel width) shown in FIG. 4(b) corresponding to pixel pattern 1 shown in FIG. 4(a) is stored in the memory 1 as a code. The code can be set arbitrarily for each pixel pattern, and for example, code "3" is set to correspond to pixel pattern 8 of FIG. 4(a) in this embodiment.

A timing control unit 2 is provided for sending clock signals CK0, CK1 and CK2 generated based on a reference clock signal to a pattern generation unit 7 and a printing time width generation unit 11, described below, and for controlling the pattern generation unit 7 and the printing time width generation unit 11 in such a way as to set the printing time width according to a pixel pattern of the input image data.

The pattern generation unit 7 is structured with a shift register 3 and a decoder 4. The shift register 3 receives input image data from unit 100 and, for each object pixel outputs image data which includes the pixel just after the object pixel, and the two pixels just before the object pixel, to the decoder 4 as $Q_A$, $Q_C$, and $Q_D$, respectively.

Input image data of "1" (indicating black) should be used as the object pixels.

The decoder 4 inputs and decodes the three bits of data ($Q_A$, $Q_C$, $Q_D$) sent from the shift register 3, and outputs data consisting of bits $Y_0$ through $Y_7$.

A data selector multiplexer 5 is provided for receiving the data $Y_0$–$Y_7$ from the decoder 4, and for outputting the code stored in the memory 1 as three-bit data by using the data $Y_0$–$Y_7$ as an address signal. For example, if the data $Y_0$–$Y_7$ output from the decoder 4 represents pixel pattern 8, the code "3" stored at a corresponding location (labeled "Pattern 8" in FIG. 1) of the memory is output from multiplexer 5 to a second data selector multiplexer 8 as three-bit data. Data selector multiplexer 8 selects one of the pulse widths which can be produced by the printing time width generation unit 11, based on the sent code, and outputs the selected pulse width to an AND gate 9 as a mask signal.

The printing time width generation unit 11 is structured with a shift register 6 and exclusive-OR logic circuits 7A–7F. Each of these exclusive-OR logic circuits outputs a clock signal having a different pulse width.

The AND gate 9 performs an AND logic operation between the mask signal and the object pixel (black data; signal $Q_B$), and outputs data, whose printing width is controlled according to the pixel pattern, to a D flip-flop 10. The D flip-flop 10 outputs that data to a laser beam printer 200 for printing. A detailed explanation of the laser beam printer 200 will be provided below in connection with FIG. 3.

The operation of the image processing apparatus having the foregoing structure will now be described.

In this embodiment, the memory 1 is structured with a data register having a capacity of 3 bits × 8, and stores three-bit printing time width codes, which are written according to the pattern of white and black made by three particular pixels (in one line in the main-scanning direction) of the input image data before initiating printing, by matching those pixels against the pixel patterns 1 to 8. The printing time width codes corresponding to the various pixel patterns are set arbitrarily.

The above-mentioned white-black pattern of three pixels is defined by the pixel just after the object pixel and the two pixels just before the object pixel, in the main-scanning direction, as shown in FIG. 4(a). Each of these three pixels surrounding the object pixel is referred herein to as adjacent or neighboring pixel 1, 2 or 3, and the pixel patterns 1 to 8 are defined by determining whether these adjacent pixels are white or black.

Each printing time width code is represented as shown in FIG. 4(b). That is, if a one dot of 200 dpi corresponds to a number "100" showing an original black pixel width, the numbers "100" "83.3", "66.7", "50.0" (which shows one dot of 400 dpi), "33.3", and "26.7" correspond to codes "1", "2", "3", "4", "5", "6", respectively.

Figure 2:
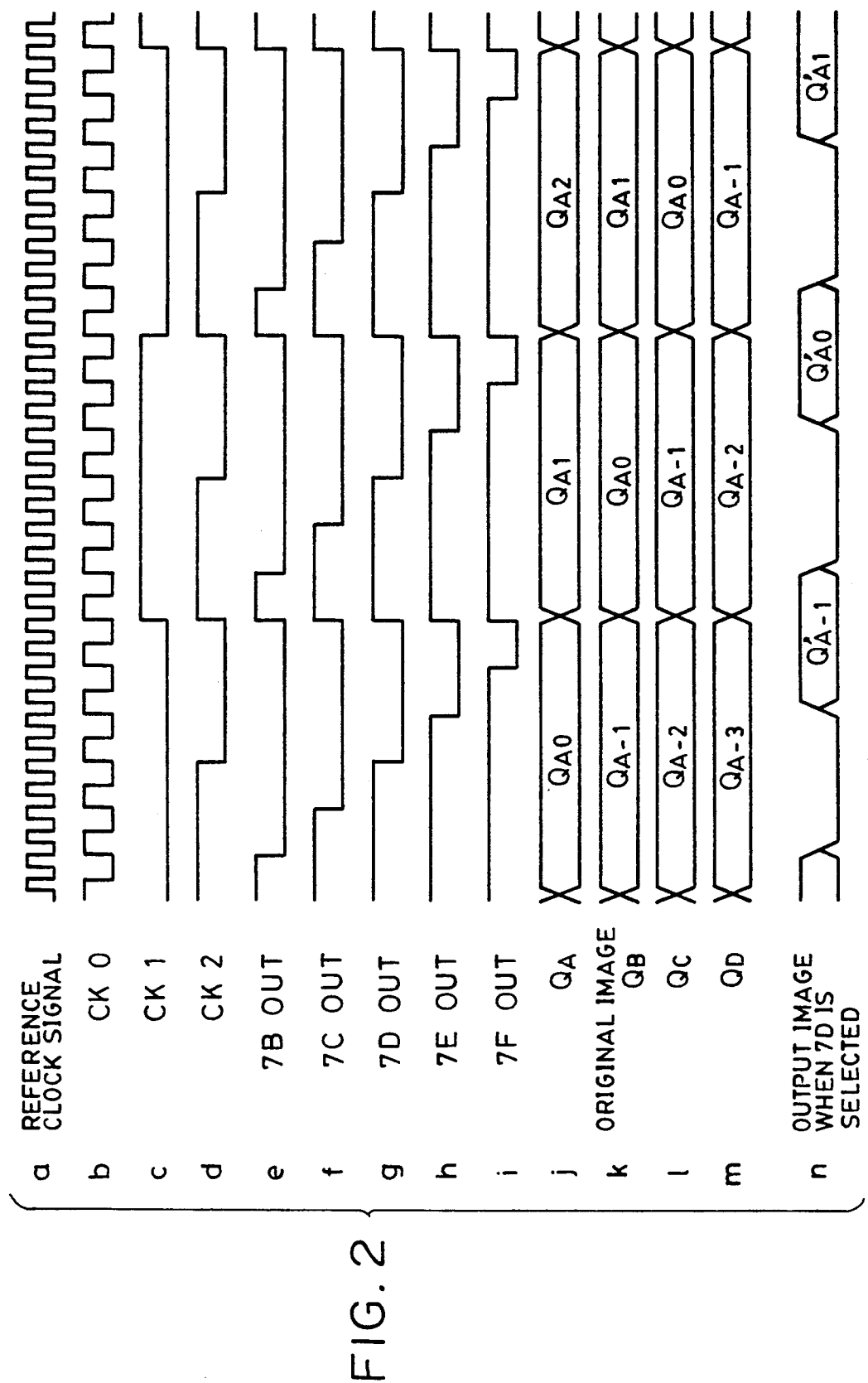
FIG. 2 is a timing chart for explaining an operation according to the embodiment of FIG. 1.

FIG. 2 is a timing chart for explaining an operation of the circuit shown in FIG. 1.

First of all, when the image data is input to input terminal A of the shift register 3 and the one bit of synchronization clock signal CK2 sent from a terminal TCK2 of the timing control unit 2 is input to an input terminal CK of the shift register, shift data $Q_A$ to $Q_D$ are output from the shift register 3 in synchronism with the rise of the clock signal CK2 (FIG. 2, line d) as shown in FIG. 2 lines j to m. The shift data $Q_A$, $Q_C$ and $Q_D$, each of which corresponds to one of the adjacent pixels 3, 2 and 1, are the pixels making up the above-mentioned pixel pattern. The shift data $Q_B$ is the object pixel.

Then, the shift data $Q_A$, $Q_C$ and $Q_D$ are output to the decoder 4, and are decoded as address data for data selector multiplexer 5, for selecting the pertinent pattern from among patterns 1 to 8 in the memory 1. The corresponding three-bit printing time width code written in the pertinent pattern of the memory 1 is output to terminals $D_A$ to $D_C$ of data selector multiplexer 8 through terminals $Q_A$ to $Q_C$ of data selector multiplexer 5.

On the other hand, the clock signals CK1 and CK0 sent from the timing control unit 2 are input to terminals A and CK of the shift register 6, respectively. Printing time width timing signals are output from the exclusive-OR logic circuits 7A to 7F to data selector multiplexer 8 by performance of exclusive-OR logic operations between clock signal CK1 and each of the outputs of the shift register 6 as shown in FIG. 2, lines e to i. The output of the exclusive-OR logic circuit 7A is the same as clock signal CK1, shown in FIG. 2, line C. Data selector multiplexer 8 selects one printing time width timing from among six available printing time width timings input to terminals $D_0$ to $D_5$ in accordance with the above-mentioned three bits of printing time width code, and outputs the selected printing time width timing to the AND gate 9 as the mask signal.

The AND gate 9 performs a logical multiplication operation between the object pixel data output from the shift register 3 as the shift data $Q_B$ and the mask signal, and the result of the logical multiplication operation is input to the D flip-flop 10. A signal synchronizing with the clock signal CK0 sent from the timing control unit 2 is used as the image data output to the laser beam printer 200 for printing. As shown in FIG. 2, in the case where the printing time width code "3", i.e., a timing 7D, is selected, the image data for printing shown in FIG. 2, line n is obtained in the form of shift for one dot.

Figure 3B:
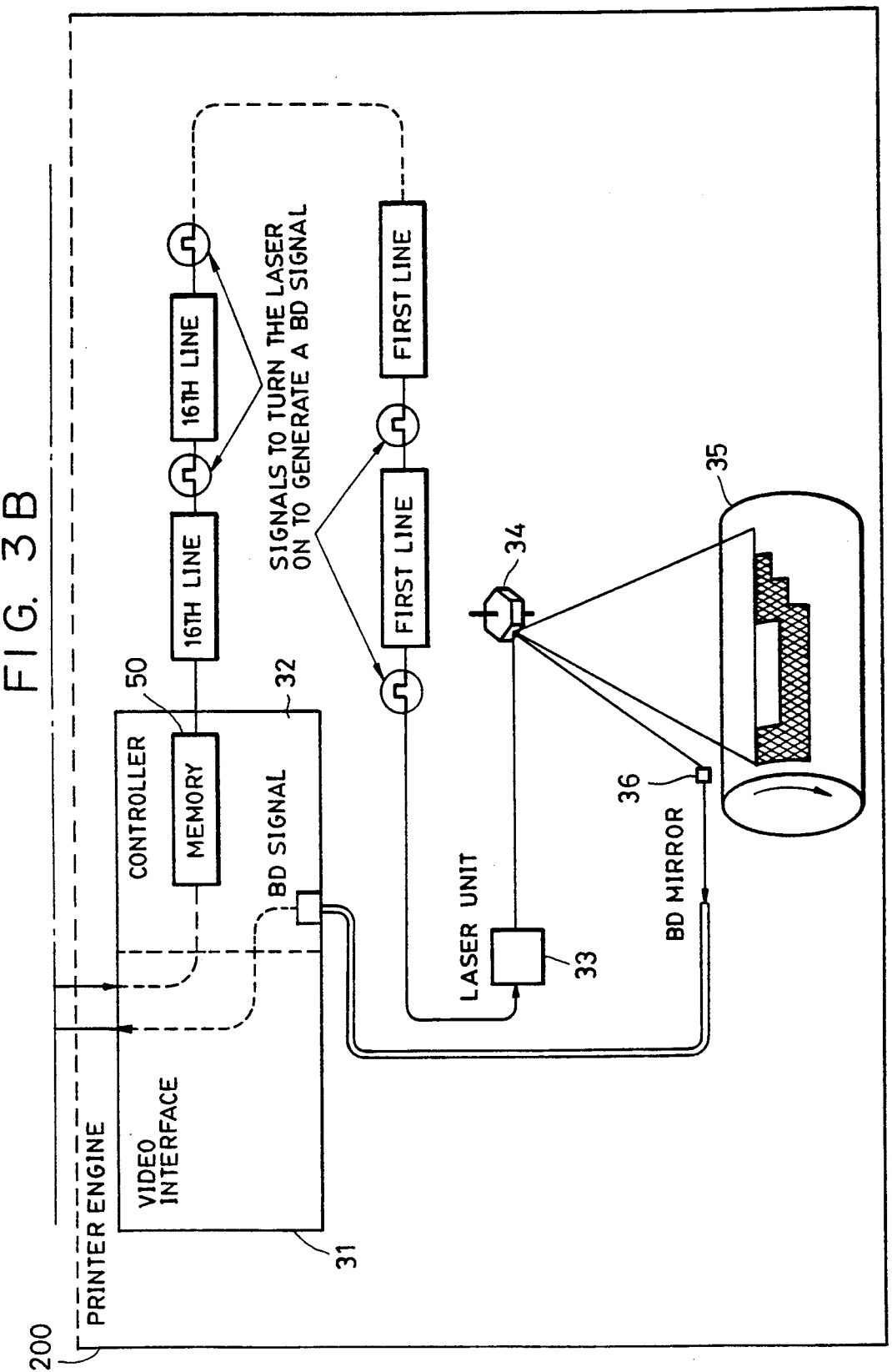

FIG. 3 is a schematic illustration of the laser beam printer 200, which is referred to as an example of the printer in the preferred embodiment.

The image data for printing is controlled by software or hardware of a video interface 31, and is input to the laser beam printer 200 through the video interface 31. The laser beam printer 200, i.e., a printer engine 200, includes a controller 32 for controlling the printer engine, a laser unit 33, a polygonal mirror 34, a photosensitive drum 35, and a BD mirror 36 for outputting a horizontal synchronizing signal.

An image "B" as shown in FIG. 3 is stored in a memory 37 incorporated into a video controller 40. The image "B" is converted into video signals 38, and is output to the printer engine 200 from the first line to the sixteenth line (in this example) sequentially in synchronism with a BD signal. The black portions of each line shown in video signals 38 are timing signals for turning on the laser unit 33. In the above described embodiment, the printing operation is carried out by using data for one line in the main-scanning direction twice successively. The video interface 31 comprises a memory 50 for sending one main-scanning line of data twice successively, wherein said one line of data is input from the video controller 40. By this means, the apparatus can print with a recording resolution of 400 dpi in the sub-scanning direction even with data of 200 dpi. In the main-scanning direction, the data of 200 dpi to converted into the data of 400 dpi and is subjected to processing for making an output image narrower as shown in FIG. 2.

Figure 6A:
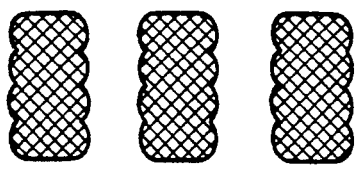
FIG. 6($a$) and 6($b$) are illustrations showing conventional printing outputs.
Figure 6B:
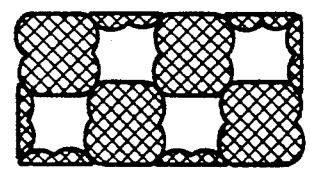

FIG. 6(a) and 6(b) illustrate known printing outputs in which a printer having a recording resolution of 400 dpi prints data of 200 dpi by converting one dot into four dots. FIG. 6(a) illustrates vertical lines having a 50% duty ratio, and FIG. 6(b) illustrates a printing output of a check pattern having a density of 50%. As shown in FIG. 6(a), the vertical lines are somewhat fat in appearance, and the whole image shown in FIG. 6(b) is distorted and shows a tendency to be darkened.

Figure 7A:
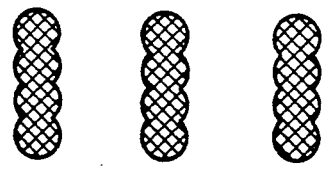
FIG. 7($a$) and 7($b$) are illustrations of printing outputs according to the embodiment of FIG. 1.
Figure 7B:
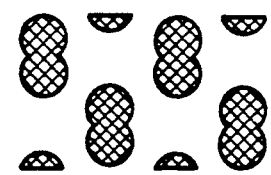

FIG. 7(a) and FIG. 7(b) illustrate printing outputs according to the preferred embodiment of the present invention in the case where the above-mentioned code 4 (50% of the original black pixel width) is used. As shown in FIG. 7(a), the vertical lines are printed as thin lines, and the whole image shown in FIG. 7(b) shows a tendency to be brightened.

FIG. 5(a), 5(b-1) and FIG. 5(b-2) illustrate an example showing variable printing time widths with relation to the surrounding pixels. FIG. 5(a) is a diagram showing correspondences between each of the pixel patterns 1 to 8 and its code. FIG. 5(b-1) and 5(b-2) illustrates white and black pixel patterns of the same pixel line showing all kinds of pixel patterns, and outputs of the printing time widths corresponding to the pixel patterns of the same pixel line. As shown in FIG. 5(b-1) and 5(b-2), the printing time width is shortened at a place where there are comparatively few surrounding black pixels. On the other hand, the printing time width is lengthened at a place where the surrounding black pixels are numerous. In an area where the black pixels occur without intervening white pixels, the printing time width is almost the same as that obtained without processing the input pixel data, as a result of which the reproducibility of the whole black is not lost.

As mentioned above, in the case where a printer having a dot resolution, which is higher than the pixel resolution of data to be recorded, is used, the minimum printing time width of the pixel or the thermal capacity (in the case of a thermal printer) should be varied arbitrarily, to output video signals. Thereby, the whole image should be reproducible without being inaccurately darkened, and thin lines should be reproducible without undue width. Further, the printing density of an isolated pixel processed by artificial halftone processing should be reproduced faithfully.

The printing time width of a given pixel can be set arbitrarily in relation to neighboring pixels, so that the reproducibility of the whole black portion does not diminish, and the printing density of an isolated pixel can be brightened. It is also possible to set the printing density as needed and instructed by a user.

Accordingly, the apparatus can quite well accommodate the difference between the pixel resolution of data and the printing dot resolution.

According to the present embodiment, it is possible to prevent the undesirable phenomenon in which a peculiar striped pattern occurs by linking of dots when a laser beam printer records an image based on image data halftone-processed by an error diffusion method.

In the above-mentioned embodiment, the pixel pattern is determined by neighboring pixels of the object pixel in the main-scanning direction. Then printing for one line in the main-scanning direction is carried out, and the same data employed in the previous line is printed for proceeding to the sub-scanning direction.

However, the pixel pattern may be selected from among various pixel patterns, each of which comprises neighboring pixels in the sub-scanning direction. In this case, as the adjacent pixels of FIG. 4(a), pixel patterns involving a number of pixels arranged along the sub-scanning direction may be provided. Line memories for plural lines may be added to the pattern generation unit 7. Then, the pixel pattern is selected by inputting image data of an object line and image data of (for example) one line before and one line behind the object line, and by decoding the input image data of three lines. It is possible to reproduce a thin line in the main-scanning direction faithfully by thinning out printing data in the case where the same image data is printed twice in the sub-scanning direction.

The image data to be input to the shift register 3 can be multi-level data. The decoder 4 can decode the multi-level data, or the codes corresponding to the pixel patterns 1 to 8 can be set in such a way that the printing time width can be lengthened in the case where the value of the multi-level data is high (dark), and shortened in the case where the value of the multi-level data is low (light).

A density key may be provided for allowing a user to set a printing density. The data set by the density key is input to the decoder 4, so that the printing density can be set irrespective of the density of input image data.

The number of neighboring pixels used as shown in FIG. 4(a) to define the various pixel patterns may be more than three. The longer the number of neighboring pixels used, the greater the range over which an appropriate printing time width can be set.

FIG. 4(b) shows six printing time widths. However, as can be seen in the relation between the reference clock signal and outputs of the exclusive-OR logic circuits 7B-7F shown in FIG. 2, the printing time width can be subdivided by raising the speed of the reference clock. In this manner, it is possible to increase the number of different printing time widths.

It should be understood that the printer described above is not limited to a laser beam printer as shown in FIG. 3 but may also be other kinds of printer, such as an ink jet printer, a thermal transfer printer, a thermal printer or the like. In a case where a single location on the recording medium is printed twice in such printers having a dot resolution higher than the pixel resolution of data to be recorded, the same effect can be obtained by changing the amount of ink for the one available size of dots or the heat capacity, instead of printing time width as with laser beam irradiation.

In the above-described embodiment, the pixel resolution of image data is 200 dpi, and the printing pixel resolution of the printer is 400 dpi. However, it should be understood that the present invention is not limited to these resolutions, but can be widely applied to various resolutions, such as a pixel resolution of image data of 100 dpi vs. printing pixel resolution of 400 dpi, a pixel resolution of image data of 200 dpi vs. printing pixel resolution of 600 dpi, etc.

As mentioned above, according to the present invention, the whole image can be reproduced without being darkened, and thin lines can be reproduced without being made to appear fat. Further, the printing density of an isolated pixel processed by an artificial halftone processing can be reproduced faithfully.

Although a particular embodiment of the present invention is herein disclosed for the purpose of explanation, various modifications thereof, after study of this specification, will be apparent to those skilled in the art to which the invention pertains.

What is claimed is:

1. An image processing apparatus comprising:
   input means for inputting data image processed by an error diffusion method;
   recording dot size control signal generating means for generating a recording dot size control signal in accordance with a pattern of the image data; and
   resolution converting means for recording plural lines of the image data for each line of the image data input by said input means on the basis of the recording dot size control signal, and for converting the image data to be recorded to data of a higher pixel resolution than a pixel resolution of the input image data.

2. An image processing apparatus according to claim 1, further comprising discrimination means for discriminating continuity of an object pixel with neighboring pixels, and wherein said receiving dot size control signal generating means generates the recording dot size control signal in accordance with a discrimination result obtained by said discrimination means.

3. An image processing apparatus comprising:
   input means for inputting image data;
   discrimination means for discriminating continuity of an object image datum with neighboring image data;
   a recording dot size control signal generating means for generating a recording dot size control signal in accordance with a discrimination result obtained by said discrimination means; and
   resolution converting means for recording plural lines of the image data for each line of the image data input by said input means on the basis of the recording dot size control signal, and for converting the image data to be recorded to data of a higher pixel resolution than a pixel resolution of the input image data.

4. An image processing apparatus according to claim 3, wherein said recording dot size control signal generating means further comprises pulse-width-modulated signal generating means for generating a pulse-width-modulated signal as the recording dot size control signal.

5. An image processing apparatus comprising;
   input means for inputting binary data;
   pulse width modulated signal generating means for generating a pulse width modulated signal which indicates the recording width of objective pixels, on the basis of binary data representing the objective pixels and neighboring pixels of the object pixels input by the said input means, wherein the width of the pulse width modulated signal is narrower than the recording width of one pixel; and resolution converting means for recording plural lines of the binary data for each line of the binary data input by said input means on the basis of the pulse width modulated signal generated by said pulse width modulated signal generating means and for converting the resolution of the input image.

6. An apparatus according to claim 5, wherein said input means inputs the binary data which was binary processed by an error diffusion method.

7. An apparatus according to claim 5, wherein said pulse width modulated signal generating means generates the pulse width modulated signal which indicates the recording width of the objective pixels, on the basis of input binary data of objective pixels and input binary data of the neighboring pixels on the same line as the objective pixels.

8. An apparatus according to claim 7, wherein said pulse width modulated signal generating means modulates the objective pixel when the binary data of the objective pixel input by said inputting means is a logical one.

* * * * *

UNITED STATES PATENT AND TRADEMARK OFFICE
CERTIFICATE OF CORRECTION

PATENT NO. : 5,294,996
DATED : March 15, 1994
INVENTOR(S) : IKUO SOBUE

Page 1 of 2

It is certified that error appears in the above-identified patent and that said Letters Patent is hereby corrected as shown below:

COLUMN 2

Line 51, "illustra-" should be deleted.
    Line 52, "tion" should be deleted; and
          "beam;" should read --beam printer--.
    Lines 53, 55, lines 53 and 55 should be deleted.
    Line 62, "5(b-1) 5(b-2) is an illustration" should read
          --5(b-1) and 5(b-2) are illustrations--.
    Line 65, "FIG. 6(a)" should read --FIGS. 6(a)--.
    Line 67, "FIG. 7(a)" should read --FIGS. 7(a)--.

COLUMN 6

Line 13, "to" should read --is--.
    Line 37, "FIG. 5(b-1)" should read --FIGS. 5(b-1)--; and
          --illustrates" should read --illustrate--.
    Line 41, "FIG. 5(b-1)" should read --FIGS. 5(b-1)--.

UNITED STATES PATENT AND TRADEMARK OFFICE
CERTIFICATE OF CORRECTION

PATENT NO. : 5,294,996
DATED : March 15, 1994
INVENTOR(S) : IKUO SOBUE

It is certified that error appears in the above-identified patent and that said Letters Patent is hereby corrected as shown below:

<u>COLUMN 8</u>

```
Line 19, "data image" should read --image data--.
Line 34, "receiving" should read --recording--.
line 61, "comprising;" should read --comprising:--.
```

Signed and Sealed this

Seventeenth Day of January, 1995

*Attest:*

BRUCE LEHMAN

*Attesting Officer*  *Commissioner of Patents and Trademarks*